(12) United States Patent
Conrad

(10) Patent No.: US 8,677,558 B2
(45) Date of Patent: Mar. 25, 2014

(54) CYCLONIC SURFACE CLEANING APPARATUS WITH A FILTRATION CHAMBER EXTERNAL TO THE CYCLONE

(75) Inventor: Wayne Ernest Conrad, Hampton (CA)

(73) Assignee: G.B.D. Corp., Nassau (BS)

( * ) Notice: Subject to any disclaimer, the term of this patent is extended or adjusted under 35 U.S.C. 154(b) by 607 days.

(21) Appl. No.: 12/675,611

(22) PCT Filed: Aug. 28, 2008

(86) PCT No.: PCT/CA2008/001534
§ 371 (c)(1),
(2), (4) Date: Feb. 26, 2010

(87) PCT Pub. No.: WO2009/026713
PCT Pub. Date: Mar. 5, 2009

(65) Prior Publication Data
US 2010/0242210 A1  Sep. 30, 2010

(30) Foreign Application Priority Data
Aug. 29, 2007  (CA) ...................................... 2599303

(51) Int. Cl.
*A47L 9/10* (2006.01)
*A47L 9/20* (2006.01)
*A47L 9/00* (2006.01)

(52) U.S. Cl.
USPC .......................................... 15/353; 15/327.2

(58) Field of Classification Search
None
See application file for complete search history.

(56) References Cited

U.S. PATENT DOCUMENTS

| | | | |
|---|---|---|---|
| 3,320,727 A | 5/1967 | Farley et al. | |
| 3,582,616 A | 6/1971 | Wrob | |
| 4,373,228 A | 2/1983 | Dyson | |
| 4,826,515 A | 5/1989 | Dyson | |
| 5,230,722 A | 7/1993 | Yonkers | |
| 5,309,601 A | 5/1994 | Hampton et al. | |
| 5,858,038 A | 1/1999 | Dyson et al. | |
| 6,081,961 A * | 7/2000 | Wang | 15/327.2 |
| 6,221,134 B1 | 4/2001 | Conrad et al. | |
| 6,406,505 B1 * | 6/2002 | Oh et al. | 55/337 |
| 6,553,612 B1 | 4/2003 | Dyson et al. | |
| 6,560,818 B1 | 5/2003 | Hasko | |
| 6,581,239 B1 | 6/2003 | Dyson et al. | |
| 6,782,585 B1 | 8/2004 | Conrad et al. | |
| 7,222,393 B2 | 5/2007 | Kaffenberger et al. | |
| 2005/0138763 A1 * | 6/2005 | Tanner et al. | 15/353 |
| 2007/0209338 A1 * | 9/2007 | Conrad | 55/345 |
| 2007/0289264 A1 * | 12/2007 | Oh | 55/318 |
| 2008/0134460 A1 * | 6/2008 | Conrad | 15/335 |

FOREIGN PATENT DOCUMENTS

JP 2000140533 A 5/2000

* cited by examiner

*Primary Examiner* — Bryan R Muller
(74) *Attorney, Agent, or Firm* — Bereskin & Parr LLP/S.E.N.C.R.L., s.r.l.; Philip C. Mendes da Costa

(57) ABSTRACT

A surface cleaning apparatus comprises a filtration apparatus comprising a cyclone downstream from the dirty air inlet and an openable filtration chamber comprising a screen downstream from the cyclone and upstream from the suction motor. The filtration chamber is accordingly a separate volume to that of the cyclone chamber and accordingly may be accessed to clean the screen independently of opening the cyclone chamber.

18 Claims, 6 Drawing Sheets

CYCLONIC SURFACE CLEANING APPARATUS WITH A FILTRATION CHAMBER EXTERNAL TO THE CYCLONE

FIELD

This application relates to surface cleaning apparatus, such as vacuum cleaners.

BACKGROUND

The use of a cyclone, or multiple cyclones connected in parallel or series, is known to be advantageous in the separation of particulate matter from a fluid stream. Currently, many vacuum cleaners, which are sold for residential applications, utilize at least one cyclone as part of the air filtration mechanism.

U.S. Pat. No. 4,826,515 (Dyson) discloses a cyclonic vacuum cleaner having two cyclonic stages, namely a first stage for separating larger particulate matter from an air stream and a second stage for separating finer particulate matter from the same air stream. Each cyclonic stage comprised a single cyclone wherein separated particulate matter was collected in the bottom of the cyclones. Vacuum cleaners, which use a cyclonic cleaning stage comprising a plurality of cyclones in parallel, are also known.

As the cyclonic stage or stages fill, a user should empty the cyclonic stage or stages. Accordingly, the cyclonic stage or stages, or the entire vacuum cleaner, may be transported to a position above a receptacle (e.g. a garbage bin or a drain) and opened so as to allow the dirt or fluid to pour into the receptacle.

In order to inhibit hair and other larger matter from traveling downstream from a cyclone, a shroud, screen or filter is typically placed in covering relationship to the cyclone air outlet. From time to time, the shroud, screen or filter may become clogged and require cleaning.

SUMMARY

In accordance with this invention, a surface cleaning apparatus comprises a filtration apparatus having a cyclone. The cyclone has an air inlet and an air outlet. A screen, such as a mesh wire screen, is positioned exterior to the cyclone in a filtration chamber, e.g., adjacent the cyclone air outlet. Accordingly, after the air exits the cyclone, the air passes through the screen. The screen may be accessed for cleaning by an access door, which is provided exterior to the cyclone (e.g. a door on an outer casing of the filtration apparatus).

In accordance with the prior art, a shroud or a screen may be provided interior of a cyclone (i.e., in the cyclone chamber). During use of the surface cleaning apparatus, elongate member such as hair and fibres may become adhered to the outer surface of the shroud or screen. Accordingly, in order to maintain the optimal cleaning efficiency of the vacuum cleaner, the shroud or screen must be cleaned from time to time. Either access must be provided to the interior of the cyclone to clean the shroud or screen, or, alternately, the shroud or screen must be removable. In accordance with this embodiment, a screen or other filtration member is positioned exterior to the cyclone. Accordingly, it is not necessary to remove a screen or shroud positioned within a cyclone chamber or to access the interior of the cyclone chamber in order to clean the screen.

In a particularly preferred embodiment, a cyclone chamber has no interior screen, shroud or filter covering the cyclone air outlet. Accordingly, no member requiring cleaning is positioned inside the cyclone chamber or surrounding the cyclone outlet (e.g. surrounding the vortex finder) and accordingly the cyclone outlet, e.g., the inlet to a vortex finder, is unobstructed.

The screen may have a surface area that is 2 times, preferably at least about 5 times, more preferably at least about 10 times and, most preferably at least about 20 times, e.g. 20-50 times, the cross sectional area of the cyclone air outlet. It will be appreciated that the screen may be flat or may be curved, e.g., bowl shaped. The use of such a large screen enhances the time during which the vacuum surface cleaning apparatus may be used without having to clean or replace the screen. Further, by positioning the screen exterior to the cyclone chamber, a large screen may be provided without reducing the size of the cyclone chamber.

In accordance with the invention, there is provided a surface cleaning apparatus comprising:
(a) a dirty air inlet;
(b) a filtration apparatus comprising a cyclone downstream from the dirty air inlet, the cyclone having a cyclone air outlet;
(c) a cyclone dirt collection chamber;
(d) a suction motor;
(e) a clean air outlet downstream from the suction motor; and,
(f) an openable filtration chamber comprising a screen, the filtration chamber is mounted to the surface cleaning apparatus and positioned downstream from the cyclone air outlet and upstream from the suction motor.

In any embodiment, the filtration chamber may be openable independently of the dirt collection chamber. Alternately, the cyclone and the dirt collection chamber are openable independently of the filtration chamber.

In any embodiment, the screen may be moveably mounted, preferably removably mounted, in the filtration chamber, such as by being moveably mounted or removably mounted to an access door provided for the filtration chamber.

In any embodiment, the cyclone air outlet may comprise a vortex finder, the vortex finder may have an inlet positioned inside the cyclone and the inlet may be unobstructed.

In any embodiment, the dirt collection chamber may be positioned around at least a portion of the cyclone, the cyclone may have a dirt collection area and the dirt collection chamber and the cyclone may be concurrently openable. For example, the dirt collection chamber may have a dirt collection surface that is moveable, the cyclone may have a cyclone wall that is moveable and is connected to the moveable dirt collection surface, whereby both the cyclone wall and the dirt collection surface may be moveable concurrently such that the dirt collection chamber and the cyclone are concurrently emptyable.

In such an embodiment, the dirt collection surface and the cyclone wall may comprise a pivoting wall of the filtration apparatus. Preferably, the cyclone wall includes a vortex finder mounted thereto. Preferably, the pivoting wall is a lower surface of the filtration apparatus. The filtration chamber may be mounted to the pivoting wall.

In any embodiment, at least a portion of the filtration chamber may be transparent. For example, the filtration chamber may have an access door that is at least partially transparent, and preferably all of the access door is transparent.

In any embodiment, the cyclone may be inverted. However, it will be appreciated that the positioning of the screen may be used with a cyclone of any configuration or orientation. Further, the positioning may be used if a cyclonic stage comprises a single cyclone or a plurality of cyclones, or even if a plurality of cyclonic stages are used in series. If a plurality of cyclonic stages are provided, then it is preferred that the screen is positioned downstream of the first cyclonic stage and upstream of the next cyclonic stage.

It will be appreciated that the filtration chamber may be removably mounted to the filtration apparatus. Accordingly, the filtration chamber may be removed and then emptied. For example, once the filtration chamber is removed from the filtration apparatus, the filtration chamber may then be opened, e.g., by pivoting, sliding or translating a wall, e.g., the lower surface, of the filtration chamber. Alternately, the filtration chamber may be opened as it is removed. For example, the top of the filtration chamber may be removably mounted to the filtration apparatus by means of a screw mount or a bayonet mount with the mating surface of the filtration apparatus comprising a wall, e.g., a top, of the filtration chamber. Thus, when the filtration chamber is removed, it is open for emptying.

Preferably, the filtration chamber is mounted to the cyclone. For example, it may be mounted to the cyclone casing that houses the cyclone or any of the cyclonic stages.

It will be appreciated that the cyclone may be emptied when mounted to the surface cleaning apparatus. Accordingly, the filtration chamber may be openable while mounted to the surface cleaning apparatus so that it may be emptied when still affixed to the surface cleaning apparatus. Alternately, if the filtration chamber is removably mounted to the filtration apparatus, it may be removed from the surface cleaning apparatus for emptying.

It will also be appreciated that the cyclone (e.g., the filtration apparatus) may be removed from the surface cleaning apparatus for emptying. In such a case, the filtration chamber is preferably removable with the filtration apparatus, i.e. mounted or removably mounted to the filtration apparatus. It will also be appreciated that the filtration chamber may remain on the surface cleaning apparatus when the cyclone is removed for emptying.

It will also be appreciated that in any embodiment, additional screens and/or filtration members may be used.

In accordance with the invention, there is also provided a preferred embodiment comprising:
(a) a dirty air inlet;
(b) a filtration apparatus having a lower surface and comprising a cyclone downstream from the dirty air inlet, the cyclone having a dirt outlet and a cyclone floor;
(c) a dirt collection chamber in communication with the dirt outlet and having a dirt collection chamber floor;
(d) an access door is provided on the lower surface, a filtration chamber is positioned between the lower surface and the access door and a screen is provided in the filtration chamber adjacent the lower air outlet of the cyclone;
(e) a suction motor; and,
(f) a clean air outlet downstream from the suction motor.

In one such embodiment, the dirt collection chamber is positioned around at least a portion of the cyclone, the dirt collection chamber floor is moveable, the cyclone floor is moveable and is connected to the lower moveable dirt collection chamber floor and the lower surface comprises the cyclone floor and the dirt collection chamber floor, whereby both the cyclone floor and the dirt collection chamber floor are moveable concurrently such that the dirt collection chamber and the cyclone are concurrently emptied.

In another such embodiment the dirt collection chamber floor and the cyclone floor comprise a pivoting bottom of the filtration apparatus.

In another such embodiment the cyclone floor includes a vortex finder mounted thereto. The screen may be positioned beneath the vortex finder.

It will be appreciated by those skilled in the art that any of the embodiments may be used individually or in a single surface cleaning apparatus, as exemplified in a preferred embodiment described herein, or in any particular sub-combination. Accordingly, any two or more embodiments may be used in a single surface cleaning apparatus. In addition, any of the optional features described herein may be used in combination with any alternate embodiment or sub-combination or combination of alternate embodiments.

BRIEF DESCRIPTION OF THE DRAWINGS

These and other advantages of the instant invention will be more fully and completely understood in conjunction with the following description of the preferred embodiments of the invention in which.

DETAILED DESCRIPTION

Figure 1:
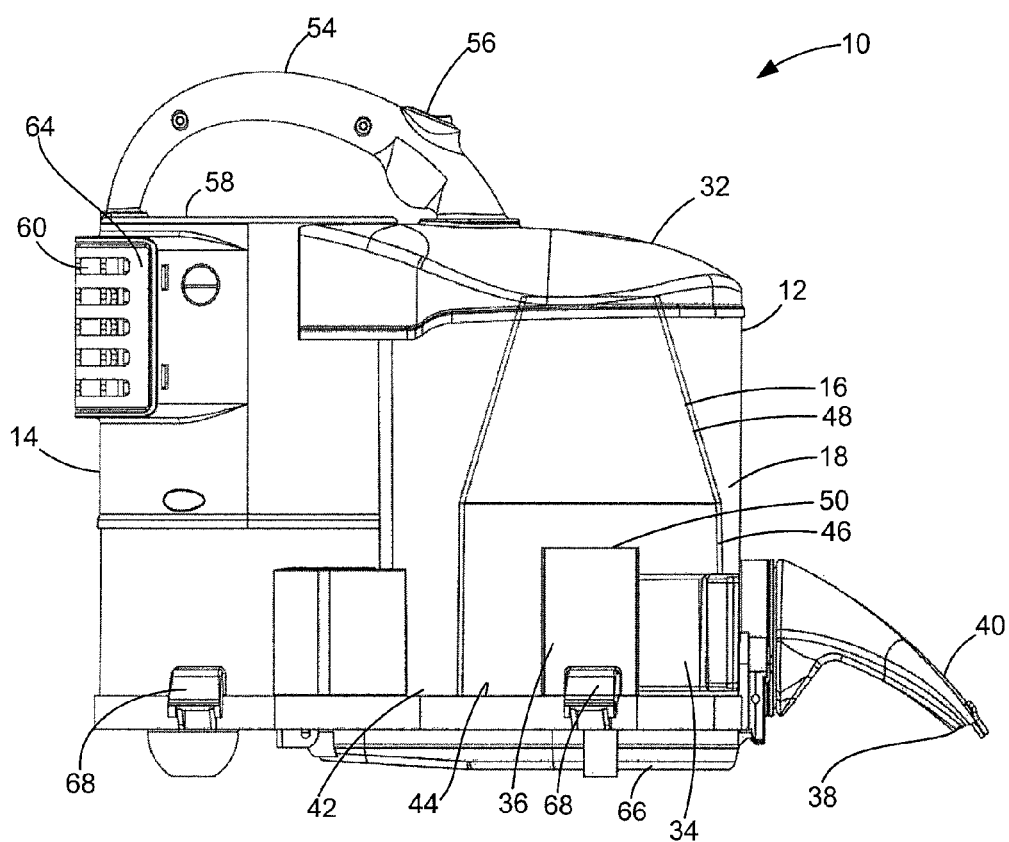
FIG. 1 is a side elevational view of a preferred embodiment of a vacuum cleaner in accordance with this design wherein the outer casing surrounding the cyclone and forming an outer wall of a dirt collection chamber is optionally transparent.
Figure 2:
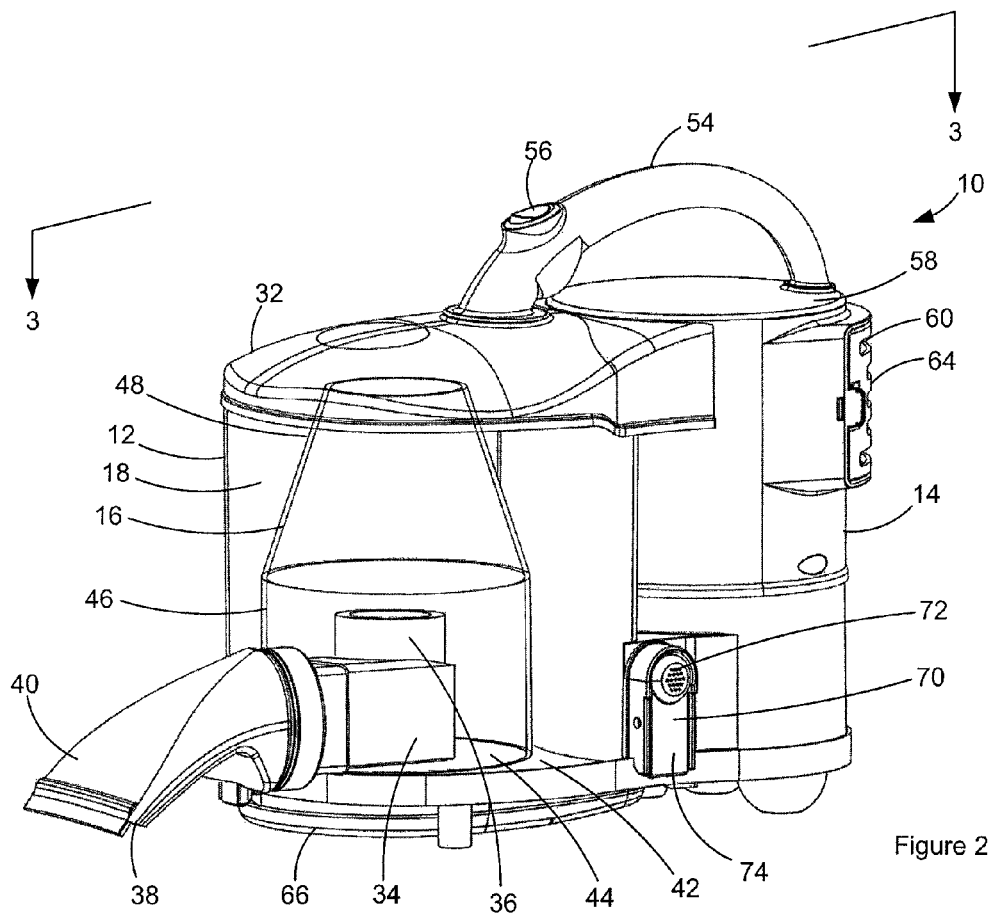
FIG. 2 is a perspective view from the front and the right side of the vacuum cleaner of FIG. 1.

As shown in FIGS. 1-6, a surface cleaning apparatus comprises a vacuum cleaner 10 having a filtration apparatus having at least one cyclone. The filtration apparatus may be of any design or configuration. As exemplified, surface cleaning apparatus 10 has a first housing 12 and a second housing 14. First housing 12 comprises at least one cyclone 16 and a dirt collection chamber 18 and second housing 14 houses the filtration members and the suction motor. In an alternate embodiment, it will be appreciated that surface cleaning apparatus 10 may have a first cyclonic cleaning stage comprising a single cyclone having a dirt collection chamber and a second cyclonic cleaning stage comprising a plurality of second stage cyclones in parallel. It will be appreciated that only a single filter may be provided and a side by side construction need not be used.

As exemplified in FIG. 3, suction motor 26 is positioned in second housing 14, preferably with a suction fan provided below the electric motor. Clean air outlet 60 is provided downstream from suction motor 26. An optional post-motor filter may be provided downstream from suction motor 26, such as in post-motor filter housing 62, which may be accessible via post motor filter housing door 64, which could be pivotally mounted to second housing 14.

As exemplified in FIGS. 1-6, vacuum cleaner 10 comprises a hand held vacuum cleaner. Accordingly, vacuum cleaner 10 may be provided with handle 54, which is affixed to lid 32 and lid 58 of second housing 14. Handle 54 may alternately be affixed to any other portion or portions of vacuum cleaner 10 as is known in the art. Optionally, as exemplified, on/off switch 56 may be provided on handle 54. On/off switch 56 may alternately be provided on any other portion of vacuum cleaner 10.

It will be appreciated that, surface cleaning apparatus may be a vacuum cleaner, a carpet extractor, a bare floor cleaner or the like. As exemplified, the surface cleaning apparatus is hand held. However the surface cleaning apparatus may be configured as an upright vacuum cleaner, a stick vacuum cleaner, a canister vacuum cleaner, a backpack or shoulder strap vacuum cleaner or other configuration known in the art. The surface cleaning apparatus may have a single cyclonic cleaning stage, which may be of any construction known in the art, or a plurality of cyclonic cleaning stages, each of which may be of any construction known in the art, e.g. they may comprise a single cyclone or a plurality of cyclones in parallel.

The following description is based on FIGS. 1-6, which exemplifies the invention in accordance with the use of an inverted cyclone. However, in an alternate embodiment, it will be appreciated that the cyclone 16 may be of any configuration and orientation and need not be inverted (e.g., cyclone 16 may be a horizontally mounted cyclone or a vertically mounted upright cyclone with an upper air inlet, an upper air out and a lower dirt outlet). Accordingly, the reference to "upper" and "lower" and "floor" are for convenience in the following discussion and relate to a preferred embodiment.

Figure 3:
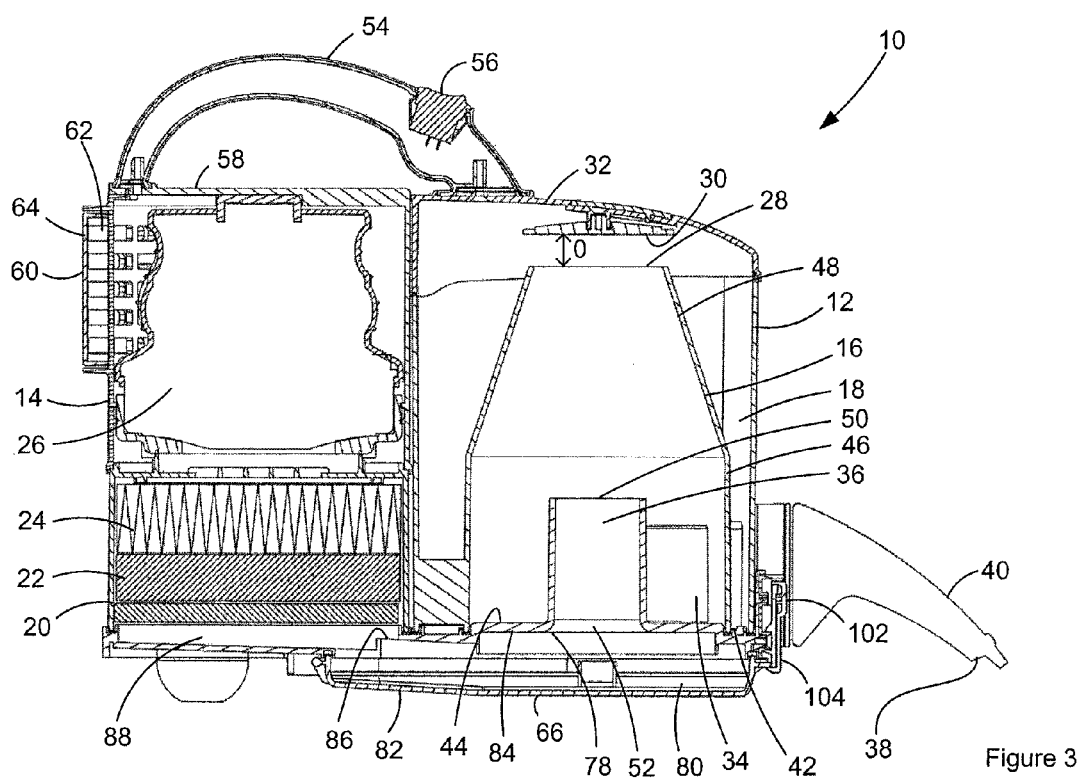
FIG. 3 is a cross-section along the line 3-3 in FIG. 2.
Figure 4:
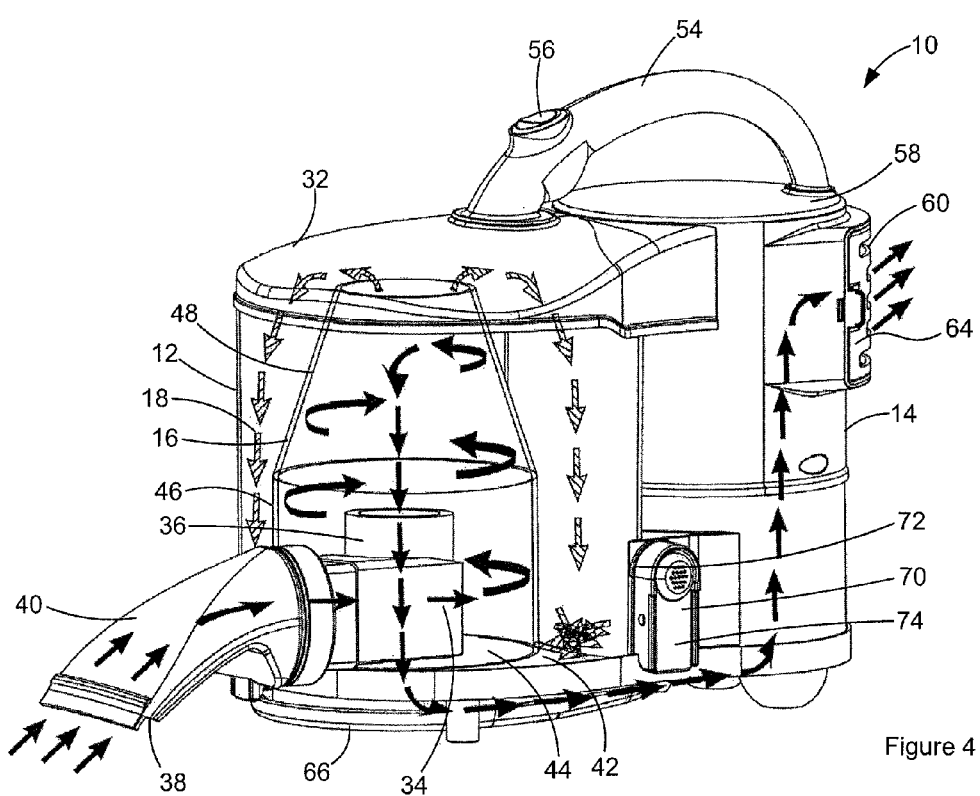
FIG. 4 is a schematic drawing of the vacuum cleaner of FIG. 1 showing the airflow passage therethrough.

As exemplified in FIG. 3, cyclone 16 has a lower air inlet 34 and a lower air outlet 36. Air inlet 34 is positioned downstream from dirty air inlet 38 of surface cleaning nozzle 40. Surface cleaning nozzle 40 may be any surface cleaning nozzle known in the art. Air inlet 34 of cyclone 16 may be in airflow communication with surface cleaning nozzle 40 in any manner known in the art. The exact structure of surface cleaning nozzle 40 and the communication passage between surface cleaning nozzle 40 and air inlet 34 will vary depending if the surface cleaning apparatus is an upright vacuum cleaner, canister vacuum cleaner or, as exemplified, a portable hand held vacuum cleaner. In operation, air will enter cyclone 16 through inlet 34 and travel upwardly, as exemplified in FIG. 4. The air will then travel downwardly to exit cyclone 16 via outlet 34. As shown in FIG. 4 by the hatched arrows, dirt will exit upwardly through outlet 28 and deposit on dirt collection chamber floor 42. In addition, some of the heavier particulate matter may not be entrained in the air stream and may be deposited on cyclone floor 34.

In an alternate embodiment, it will be appreciated that cyclone 16 may be any cyclone casing having a separator plate to divide the cyclone casing into an upper cyclone chamber positioned above the separator plate and a lower dirt collection chamber positioned below the separator plate. Alternately, the cyclone may be provided with a dirt outlet 28 and may be provided with an impingement member 30 or members spaced a distance D from the dirt outlet and facing the dirt outlet. The cyclone may be an upright cyclone or a cyclone having a single direction of travel of the air.

As exemplified, cyclone 16 is a frustoconical cyclone having cylindrical portion 46 and frustoconical portion 48. Alternately, or in addition to the orientation of cyclone 16, it will be appreciated that cyclone 16 may be cylindrical, entirely frustoconical or any other shape known in the art.

As exemplified in FIG. 3, outlet 36 of cyclone 16 comprises a vortex finder that extends inwardly into the cyclone chamber defined by cyclone 16. Outlet 36 preferably comprises a generally cylindrical passage having an inlet 50 and an outlet 52. It will be appreciated that, in an alternate embodiment any outlet or vortex finder known in the art for cyclones may be utilized. While inlet 50 may be covered by a screen, shroud or filter as in known in the art, it is preferred that no screen, shroud or filter is provided. Accordingly, inlet 50 will not become clogged during use and will not require cleaning. Accordingly, it will be appreciated that bottom 44 need not be openable to permit a screen or a shroud or filter associated with inlet end 50 of outlet 36 to be cleaned. The material that would otherwise clog a screen or shroud that surrounds inlet 50 will be retained by screen 78 which may be easily accessed and with may be larger than a screen in a cyclone chamber.

While the use of impingement member 30 is exemplified in a surface cleaning apparatus having side-by-side housings 12, 14, it will be appreciated that this design may be used in any vacuum cleaner configuration. It will also be appreciated that an impingement surface need not be used.

In accordance with any embodiment of this invention, dirt collection chamber 18 may surround at least a portion of and, as exemplified, preferably all of cyclone 16. Accordingly, cyclone 16 may be positioned in dirt collection chamber 18 and, preferably, generally centrally therein.

In accordance with any embodiment, vacuum cleaner 10 may be configured such that the dirt collected on floor 44 of cyclone 16 is emptied at the same time as dirt collected on floor 42 of dirt collection chamber 18. The following description refers to the embodiment of FIGS. 1-6 wherein the openable end of the dirt collection camber is the dirt collection surface (floor 42). However, in an alternate embodiment, it will be appreciated that the openable portion need not be the dirt collection surface. For example, if cyclone 16 is mounted horizontally, then the openable portion may be the end of dirt collection chamber 18 facing dirt outlet 28 to which impingement member 30 is attached. In such a case, the dirt collection surface will be a sidewall of dirt collection chamber 18.

As exemplified, floor 42 and floor 44 are both movable and connected to each other whereby both floor 42 and 44 are concurrently movable such that dirt collection chamber 18 and cyclone 16 are concurrently emptied. In an alternate embodiment, dirt collection chamber 18 may be provided in the bottom of cyclone 16.

Figure 5:
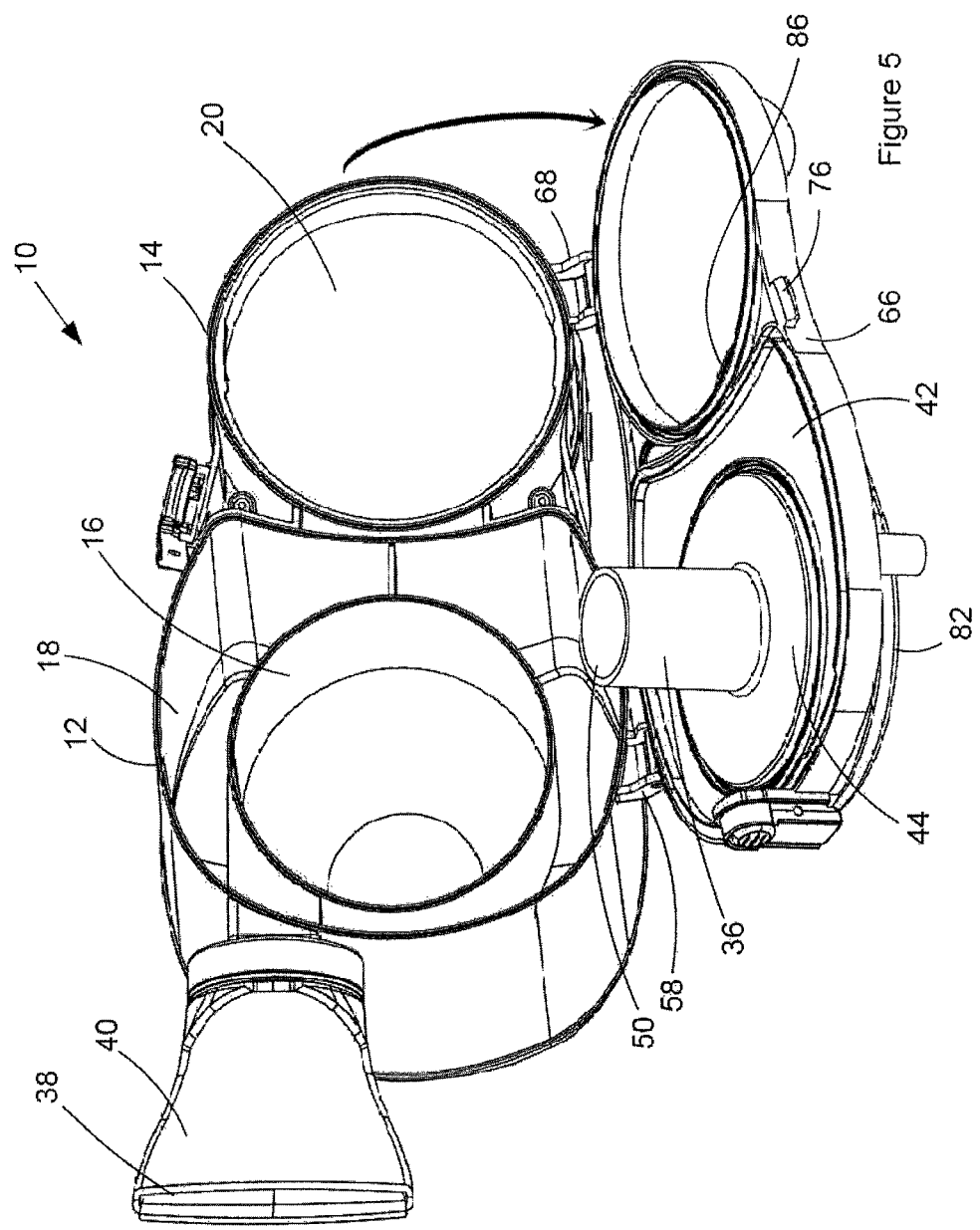
FIG. 5 is a perspective view from the bottom of the vacuum cleaner of FIG. 1 wherein the bottom of the first and second housings is open; and, FIG. 6 is a perspective view of the bottom of the vacuum cleaner of FIG. 1 wherein the first and second housings are closed but an access door is open.

Referring to FIG. 5, floors 42 and 44 may comprise a pivoting bottom of first housing 12 and, alternately, of the filtration apparatus (e.g. housings 12 and 14 of this embodiment). Accordingly, as seen in FIG. 5, when floors 42 and 44 are opened, both cyclone 16 and dirt collection chamber 18 may be emptied by holding vacuum cleaner 10 in the upright position (as shown in FIG. 1). Accordingly, the dirt will fall out of collection chamber 16 and cyclone 16 and will fall downwardly off of floors 42 and 44.

As shown in FIG. 5, housings 12 and 14 have a pivoting bottom 66, which is secured to each of housings 12 and 14 by a pivot 68. In the closed position exemplified in FIGS. 1 and 4, pivoting bottom 66 is secured in position by latch 70. Latch 70 has a button 72 which, when pressed, causes arm 74 to move outwardly thereby disengaging a flange provided on the bottom end of arm 74 from flange 76 provided on pivoting bottom 66. A gasket or other sealing member may be provided at the interface of housings 12 and 14 and pivoting bottom 66 to provide an air tight or fluid tight seal. It will be appreciated that bottom 66 may be moveable in any other direction by any other means known in the art (e.g., slideable, translatable) and may optionally be removable from housings 12, 14 (e.g., by a snap fit, a screw mount, a bayonet mount or the like). Further, bottom 66 may be moveably secured in position by any other means known in the art and need not be connected to surface cleaning apparatus 10 for relative motion thereto.

As exemplified in FIG. 5, outlet 36 is provided as part of floor 42, and is preferably integrally molded therewith. In an alternate embodiment, it will be appreciated that outlet 36 need not be removable from cyclone 16 with floor 42.

In an alternate embodiment, it will be appreciated that only floors 42 and 44 may be pivotably mounted to housing 12. In such an embodiment, foam filter 20 may remain sealed when cyclone 16 and dirt collection chamber 18 are emptied. In an alternate embodiment, a side-by-side of housings 12, 14 design as exemplified in FIG. 1 need not be utilized. In such a case, floor 42 and floor 44 may comprise the entire floor of the filtration assembly.

If bottom 66 opens both housings 12 and 14, then it will be appreciated that dirt positioned on the upstream surface of filter 20 will be emptied when bottom 66 is opened.

As exemplified, screen 78 is provided in an openable filtration chamber 80. As exemplified, filtration chamber 80 is provided as part of the lower surface of cyclone 16. It will be appreciated that it is preferred that filtration chamber 80 is positioned adjacent air outlet 36 of cyclone 16, or downstream of the first cyclonic stage if a plurality of cyclonic stages are provided. If filtration chamber is positioned beside cyclone 16, e.g., it is located where foam filter 20 is provided, it will be appreciated that filtration chamber 80 and cyclone 16 may be concurrently opened, e.g., by a pivoting bottom 66. Alternately, or in addition, using a similar construction, filtration chamber 80 may be opened when dirt collection chamber 18 is opened.

As exemplified, filtration chamber 80 is openable independently of any other member, e.g., cyclone 16, dirt collection chamber 18 and the chamber housing foam filter 20. Also, as exemplified, the lower surface of filtration chamber 80 is openable. However, it will be appreciated that an alternate wall or portion of filtration chamber 80 may be openable and that filtration chamber 80 may be at alternate locations on a surface cleaning apparatus provided it is located downstream in the fluid flow path through the surface cleaning apparatus from the first cyclonic cleaning stage.

As exemplified, filtration chamber 80 is provided adjacent outlet 36 and, preferably, screen 78 is in sealing engagement with outlet 52. It will be appreciated that screen 80 is preferably mounted in filtration chamber 80 such that the air exiting cyclone 16 is forced to pass through screen 78 as the air travel downstream of filtration chamber 80 (e.g., to a second cyclonic cleaning stage or foam filter 80). Referring to FIG. 3, screen 78 is positioned on rear surface 84 of floor 44 and overlies outlet 52. Accordingly, air that exits outlet 36 travels through screen 78. The air then travels through filtration chamber 80 and travels laterally to outlet 86, which is in air flow communication with headspace 88 below filter 20.

Preferably, screen 78 comprises a screen, such as an open mesh screen, e.g., a wire mesh screen or, alternately, a plastic mesh screen. It may be flat or curved, e.g. bowl shaped, so as to increase the surface area of the screen.

In one embodiment, filtration chamber 80 has an openable portion. Accordingly, an access door 82 may be provided to permit access to screen 78 such that screen 78 may be cleaned. Access door 82 may be any door that is movably mounted in overlying relationship to filtration chamber 80. It will also be appreciated that if filtration chamber 80 is removably mounted to surface cleaning apparatus 10, it may be opened as it is removed from surface cleaning apparatus 10. For example, a wall of surface cleaning apparatus 10 to which filtration chamber 80 is attached may close the side of filtration chamber 80 that abuts surface cleaning apparatus 10. However, it is preferred that a lower surface of filtration chamber 80 is openable.

Figure 6:
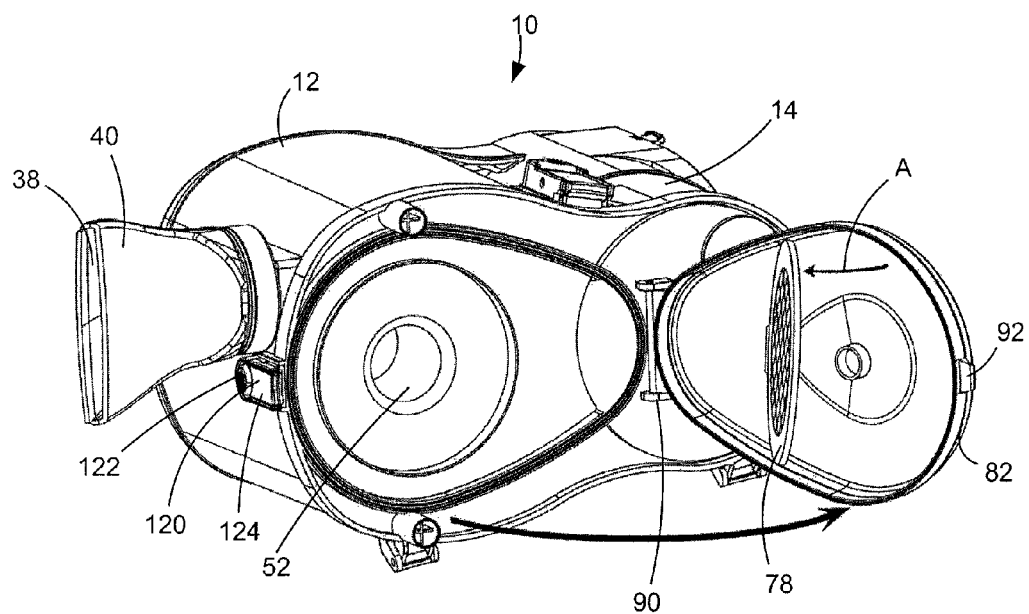

As exemplified in FIG. 6, access door 82 may be pivotally mounted by pivot 90 to pivoting bottom 66, and is secured in position by a latch 120. Latch 120, for example, may have a button 122 which, when pressed, causes arm 124 to move outwardly thereby disengaging a flange on the bottom end of arm 124 from flange 92 provided on the front end of access door 82. A sealing gasket or other sealing member known in the art may be utilized to provide an air tight or fluid tight seal for filtration chamber 80. Any other securing member known in the art may be used. Further door 82 may be removable and need not be connected to surface cleaning apparatus 10 for relative (e.g., sliding, translation) motion thereto.

Preferably, screen 78 is mounted and, more preferably, movably mounted and, most preferably, removably mounted to access door 82. As shown in FIG. 6, screen 78 is pivotally mounted to the inner surface of access door 82. Accordingly, when a user desires to clean screen 78, it may be pivoted in the direction shown by arrow A in FIG. 6 to an open or cleaning position. Alternately, screen 78 may be movably mounted and, preferably, removably mounted to another portion of filtration chamber 80.

It will be noticed that access door 82 may be opened independently of pivoting bottom 66. In an alternate embodiment, it will be appreciated that a pivoting bottom 66 need not be provided.

Preferably, at least a portion of and, more preferably, all of access door 82 is transparent. Accordingly, a user may lift the vacuum cleaner, invert the vacuum cleaner or tilt the vacuum cleaner on its side to view screen 78 and determine whether filtration 78 requires cleaning or, alternately, replacement. It will be appreciated that another part of filtration chamber 80, preferably all of filtration chamber 80, may be transparent.

As exemplified in FIG. 3, vortex finder 36 is not surrounded by a screen or any shroud or filter. In accordance with a preferred embodiment, vortex finder 36 has no cover member (e.g. shroud, screen or the like).

Accordingly, no filtration or screen member interior of cyclone 16 requires cleaning. Accordingly, it will be appreciated that bottom 44 need not be openable to permit a screen or a shroud or filter associated with inlet end 50 of outlet 36 to be cleaned.

In accordance with any embodiment of this invention, a series filtration members may be used in series downstream from screen 78. In accordance with this preferred embodiment, the filtration members may comprise two or more of a foam filter 22 downstream from screen 78, a felt filter 22 downstream from foam 20 and a HEPA filter 24 downstream from felt filter 22. Preferably, all of these filters are positioned upstream from suction motor 26. Alternately, one or more of these filters may be positioned downstream from suction motor 26. In particular HEPA filter 24 may be downstream from suction motor 26. Accordingly, a plurality of screening and filtration members, each of which have a finer filtration capacity (e.g. smaller pores) are provided in series in the downstream direction. Optionally, a shroud (e.g. a perforated or apertured plastic cover) may be provided surrounding or overlying inlet 50 of outlet 36.

It will also be appreciated that any of the aforementioned embodiments may be used singly or in any particular combination or sub-combination of the remaining features listed above.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A surface cleaning apparatus comprising:
   (a) a dirty air inlet;
   (b) a filtration apparatus comprising a cyclonic cleaning stage downstream from the dirty air inlet and having a vortex finder provided in a cyclone chamber;
   (c) a suction motor;
   (d) a clean air outlet downstream from the suction motor;
   (e) an openable filtration chamber comprising a screen, an upstream wall having an air inlet and a downstream wall having an air outlet, the filtration chamber is positioned downstream from the vortex finder and upstream from the suction motor; and,
   (f) an openable pre-motor filter chamber comprising a pre-motor filter positioned downstream of the downstream wall and comprising a door sealing the pre-motor filter chamber, the pre-motor filter chamber is openable independently of the filtration chamber by opening said door.

2. The surface cleaning apparatus of claim 1 wherein the filtration chamber is openable independently of the dirt collection chamber.

3. The surface cleaning apparatus of claim 1 wherein the cyclonic cleaning stage comprises a cyclone and a dirt collection chamber that are openable independently of the filtration chamber.

4. The surface cleaning apparatus of claim 1 wherein the screen is moveably mounted in the filtration chamber.

5. The surface cleaning apparatus of claim 1 wherein the screen has a surface area that is at least twice the surface area of the cross sectional area of the cyclone air outlet.

6. The surface cleaning apparatus of claim 1 wherein the screen has a surface area that is at least about five times the surface area of the cross sectional area of the cyclone air outlet.

7. The surface cleaning apparatus of claim 1 wherein the cyclone air outlet comprises an inlet positioned inside a cyclone and the inlet is unobstructed.

8. The surface cleaning apparatus of claim 1 wherein the cyclonic cleaning stage comprises a dirt collection chamber and a cyclone and the dirt collection chamber is positioned around at least a portion of the cyclone, the cyclone has a dirt collection area and the dirt collection chamber and the cyclone are concurrently openable.

9. The surface cleaning apparatus of claim 8 wherein the dirt collection chamber has a dirt collection surface that is moveable, the cyclone has a cyclone wall that is moveable and is connected to the moveable dirt collection surface, whereby both the cyclone wall and the dirt collection surface are moveable concurrently such that the dirt collection chamber and the cyclone are concurrently emptyable.

10. The surface cleaning apparatus of claim 9 wherein the dirt collection surface and the cyclone wall comprise a pivoting wall of the filtration apparatus.

11. The surface cleaning apparatus of claim 1 wherein at least a portion of the filtration chamber is transparent.

12. The surface cleaning apparatus of claim 1 wherein the filtration chamber has an access door that is at least partially transparent.

13. The surface cleaning apparatus of claim 1 wherein the filtration chamber is removably mounted to the filtration apparatus.

14. A surface cleaning apparatus comprising:
   (a) a dirty air inlet;
   (b) a filtration apparatus comprising a cyclonic cleaning stage downstream from the dirty air inlet and having a cyclone air outlet;
   (d) a suction motor;
   (e) a clean air outlet downstream from the suction motor; and,
   (f) an openable filtration chamber comprising a screen and an access door and the screen is directly attached to, and moveably mounted with respect to, the access door whereby the screen is moved when the access door is opened and the screen is also moveable relative to the access door.

15. The surface cleaning apparatus of claim 14 wherein the screen is pivotally mounted to the access door.

16. A surface cleaning apparatus comprising:
   (a) a dirty air inlet;
   (b) a filtration apparatus comprising a cyclone downstream from the dirty air inlet, the cyclone having a cyclone air outlet;
   (c) a cyclone dirt collection chamber exterior to the cyclone, the dirt collection chamber having an openable end wall comprising a dirt collection surface, wherein the dirt collection chamber is emptyable when the end wall is opened;
   (e) a suction motor;
   (f) a clean air outlet downstream from the suction motor; and,
   (g) an openable filtration chamber comprising a filter housing enclosing the filtration chamber and having a screen, an air inlet and an air outlet, the filtration chamber is provided on the openable end wall and positioned downstream from the cyclone air outlet and upstream from the suction motor, the filtration chamber having a pivoting wall pivotally connected to the openable wall.

17. The surface cleaning apparatus of claim 10 wherein the filtration chamber is mounted to the pivoting wall.

18. The surface cleaning apparatus of claim 16 further comprising a pre-motor filter chamber which is openable independently of the filtration chamber.

* * * * *